US011654847B2

United States Patent
Renegar

(10) Patent No.: US 11,654,847 B2
(45) Date of Patent: May 23, 2023

(54) UNIFORM DECELERATION UNIT CRASH BOX

(71) Applicant: Tesseract Structural Innovations, Inc., Fayetteville, AR (US)

(72) Inventor: Henry L. Renegar, Fayetteville, AR (US)

(73) Assignee: Tesseract Structural Innovations, Inc., Fayetteville, AR (US)

( * ) Notice: Subject to any disclaimer, the term of this patent is extended or adjusted under 35 U.S.C. 154(b) by 25 days.

(21) Appl. No.: 17/315,153

(22) Filed: May 7, 2021

(65) Prior Publication Data

US 2021/0331641 A1   Oct. 28, 2021

Related U.S. Application Data

(63) Continuation of application No. 16/094,988, filed as application No. PCT/US2017/028750 on Apr. 21, 2017, now Pat. No. 11,040,680.

(Continued)

(51) Int. Cl.
*B60R 19/26* (2006.01)
*B60R 19/34* (2006.01)
(Continued)

(52) U.S. Cl.
CPC ............. *B60R 19/26* (2013.01); *B60R 19/00* (2013.01); *B60R 19/02* (2013.01); *B60R 19/18* (2013.01);
(Continued)

(58) Field of Classification Search
CPC .... B60R 19/34; B60R 19/26; B60R 2019/264
(Continued)

(56) References Cited

U.S. PATENT DOCUMENTS 4,029,350 A    6/1977   Goupy et al.
4,190,275 A *   2/1980   Mileti ................... E01F 15/148
                                                                                                        293/142

(Continued)

FOREIGN PATENT DOCUMENTS

CA            2422415 A1    9/2003
DE    10 2008 062505 A1    8/2009
(Continued)

OTHER PUBLICATIONS

Japanese Office Action dated Aug. 6, 2021 in connection with Japanese Application No. 2018-555153, and English translation thereof.
(Continued)

*Primary Examiner* — Dennis H Pedder
(74) *Attorney, Agent, or Firm* — Wolf, Greenfield & Sacks, P.C.

(57) ABSTRACT

A crash box may include one or more layers arranged to absorb crash energy. In some embodiments, the crash box includes a first layer having an outer skin defining a periphery of the first layer and at least one of: 1) a rib and web structure, and 2) an array of tubes disposed within the outer skin for absorbing crash energy, and a second layer adjacent to the first layer, the second layer having an outer skin defining a periphery of the second layer and at least one of: 1) a rib and web structure, and 2) an array of tubes disposed within the outer skin for absorbing crash energy.

22 Claims, 10 Drawing Sheets

Related U.S. Application Data

(60) Provisional application No. 62/325,642, filed on Apr. 21, 2016.

(51) Int. Cl.
| | | |
|---|---|---|
| *F16F 7/12* | (2006.01) | |
| *B60R 19/18* | (2006.01) | |
| *B60R 19/00* | (2006.01) | |
| *B60R 19/02* | (2006.01) | |
| *B60R 19/36* | (2006.01) | |
| *F16F 7/00* | (2006.01) | |

(52) U.S. Cl.
CPC .............. *B60R 19/34* (2013.01); *B60R 19/36* (2013.01); *F16F 7/003* (2013.01); *F16F 7/121* (2013.01); *B60R 2019/264* (2013.01); *F16F 2224/0225* (2013.01); *F16F 2226/04* (2013.01)

(58) Field of Classification Search
USPC ......................................................... 293/134
See application file for complete search history.

(56) References Cited

U.S. PATENT DOCUMENTS

| | | | |
|---|---|---|---|
| 4,352,484 | A | 10/1982 | Gertz et al. |
| 4,822,011 | A | 4/1989 | Goldbach et al. |
| 4,934,751 | A | 6/1990 | Shimada |
| 5,547,737 | A | 8/1996 | Evans et al. |
| 5,906,410 | A | 5/1999 | Dalinkiewicz |
| 6,007,123 | A | 12/1999 | Schwartz et al. |
| 6,270,131 | B1 | 8/2001 | Martinez et al. |
| 6,286,867 | B1 | 9/2001 | Braemig et al. |
| 6,341,813 | B1 | 1/2002 | Taghaddos |
| 6,547,295 | B2 | 4/2003 | Vismara |
| 6,726,258 | B1 | 4/2004 | Sundgren et al. |
| 6,729,451 | B2 | 5/2004 | Yamagiwa |
| 6,758,507 | B2 | 7/2004 | Tarahomi |
| 6,840,301 | B2 | 1/2005 | Nichol et al. |
| 6,866,084 | B2 | 3/2005 | Asholt et al. |
| 6,932,146 | B2 | 8/2005 | Nichol et al. |
| 6,998,535 | B2 | 2/2006 | Nichol |
| 7,114,764 | B1 | 10/2006 | Barsoum et al. |
| 7,341,277 | B2 | 3/2008 | Huttsell et al. |
| 8,684,427 | B2 | 4/2014 | Marur et al. |
| 8,979,146 | B2 | 3/2015 | Kano et al. |
| 9,394,005 | B1 | 7/2016 | Enders |
| 10,556,559 | B2 | 2/2020 | Renegar |
| 10,710,638 | B2 | 7/2020 | Kawase et al. |
| 10,800,459 | B2 | 10/2020 | Ayukawa |
| 11,021,120 | B2 | 6/2021 | Renegar |
| 11,040,680 | B2 | 6/2021 | Renegar |
| 11,097,676 | B2 | 8/2021 | Renegar |
| 11,097,782 | B2 | 8/2021 | Renegar |
| 2002/0012771 | A1 | 1/2002 | Fiorinelli et al. |
| 2002/0017805 | A1 | 2/2002 | Carroll, III et al. |
| 2002/0047281 | A1 | 4/2002 | Hartel et al. |
| 2003/0030290 | A1 | 2/2003 | Yamagiwa |
| 2003/0141712 | A1 | 7/2003 | Miyasaka |
| 2003/0227182 | A1 | 12/2003 | Yoshida et al. |
| 2005/0218696 | A1 | 10/2005 | Aase et al. |
| 2006/0021697 | A1 | 2/2006 | Riley et al. |
| 2006/0082168 | A1 | 4/2006 | Joosten et al. |
| 2006/0103044 | A1 | 5/2006 | Cate et al. |
| 2007/0096507 | A1 | 5/2007 | Brunner et al. |
| 2008/0150273 | A1 | 6/2008 | Sugiyama et al. |
| 2009/0152901 | A1 | 6/2009 | Takeuchi et al. |
| 2009/0160203 | A1 | 6/2009 | Garg et al. |
| 2011/0101714 | A1 | 5/2011 | Bator |
| 2011/0193369 | A1 | 8/2011 | Wuest et al. |
| 2013/0161932 | A1 | 6/2013 | Murray |
| 2014/0207340 | A1 | 7/2014 | Kunsch et al. |
| 2014/0375081 | A1 | 12/2014 | Kuriyama et al. |
| 2015/0158442 | A1 | 6/2015 | Yun et al. |
| 2015/0175093 | A1 | 6/2015 | Vaughn, Jr. |
| 2015/0367798 | A1 | 12/2015 | Bobba |
| 2016/0114667 | A1 | 4/2016 | Ikeda et al. |
| 2017/0028950 | A1 | 2/2017 | Keller et al. |
| 2017/0274848 | A1 | 9/2017 | Renegar |
| 2018/0148106 | A1 | 5/2018 | Ayukawa |
| 2019/0152413 | A1 | 5/2019 | Renegar |
| 2019/0308574 | A1 | 10/2019 | Renegar |
| 2021/0163073 | A1 | 6/2021 | Renegar |
| 2022/0250684 | A1 | 8/2022 | Renegar |
| 2022/0289125 | A1 | 9/2022 | Naoi et al. |

FOREIGN PATENT DOCUMENTS

| | | |
|---|---|---|
| DE | 10 2009 035778 A1 | 3/2010 |
| EP | 1 459 941 A1 | 9/2004 |
| EP | 1 464 547 A1 | 10/2004 |
| JP | S50-134595 U | 11/1975 |
| JP | H01-063479 A | 3/1989 |
| JP | H05-238418 A | 9/1993 |
| JP | H11-255049 A | 9/1999 |
| JP | 2000-264255 A | 9/2000 |
| JP | 2006-248284 A | 9/2006 |
| JP | 2007-045352 A | 2/2007 |
| JP | WO2009037787 A1 * | 3/2009 |

OTHER PUBLICATIONS

International Search Report and Written Opinion for International Application No. PCT/US2017/028750, dated Jul. 14, 2017.

Extended European Search Report for European Application No. 17786682.9, dated Aug. 30, 2019.

[No Author Listed] CYMAT: Aluminum Foam Technology Applied to Automotive Design. 10 pages.

International Preliminary Report on Patentability dated Nov. 1, 2018, in connection with International Application No. PCT/US2017/028750.

* cited by examiner

UNIFORM DECELERATION UNIT CRASH BOX

CROSS-REFERENCE TO RELATED APPLICATIONS

This application is a continuation application and claims the benefit under 35 U.S.C. § 120 of U.S. application Ser. No. 16/094,988, filed Oct. 19, 2018, which is a National Stage filing under 35 U.S.C. § 371 of International Patent Application Serial No. PCT/US2017/028750, filed Apr. 21, 2017, which claims the benefit under 35 U.S.C. § 119(e) to U.S. Provisional Application Ser. No. 62/325,642, entitled "Uniform Deceleration Unit Crash Box" and filed Apr. 21, 2016, the contents of each of which are herein incorporated by referenced in their entireties.

FIELD

The disclosed embodiments relate generally to automobiles and more particularly to safety systems arranged to absorb crash energy during impact.

BACKGROUND

Automobile accidents are an unfortunate reality in the world today. Every year tens of thousands of accidents occur in the United States alone. These accidents at minimum cause a financial strain on the automobile's owner and insurance companies and in worst case scenarios result in the fatality of the driver and/or other occupants of the vehicle. The National Safety Council estimates 38,300 people were killed and 4.4 million injured on U.S. roads in 2015. Frontal impacts accounted for 53 percent of passenger vehicle occupant deaths in 2014.

Even with increased emphasis on vehicle safety over the past 4 decades, the number of accidents has continued to increase. Vehicle safety has continued to improve with the addition of features such as seat belts, crumple zones, front air bags, and side air bags, all of which were designed to help vehicle occupants survive a crash. Today, there are a variety of other safety features such as lane departure systems and electronic crash avoidance systems that have the potential of making new vehicles even safer on the road.

SUMMARY

According to one embodiment, a crash box for a motor vehicle includes a crash pad having an outer skin defining a periphery of the crash pad and a rib and web structure disposed within the outer skin and arranged to absorb crash energy.

According to another embodiment, a crash box for a motor vehicle includes a first layer having an outer skin defining a periphery of the first layer and at least one of: 1) a rib and web structure, and 2) an array of tubes disposed within the outer skin for absorbing crash energy, and a second layer adjacent to the first layer, the second layer having an outer skin defining a periphery of the second layer and at least one of: 1) a rib and web structure, and 2) an array of tubes disposed within the outer skin for absorbing crash energy.

According to still another embodiment, a method of assembling a crash box is disclosed. The method includes providing a plurality of crash pads, selecting a first crash pad from the plurality of crash pads, the first crash pad having an outer skin defining a periphery of the first crash pad and at least one of: 1) a rib and web structure, and 2) an array of tubes disposed within the outer skin for absorbing crash energy, selecting a second crash pad from the plurality of crash pads, the second crash pad having an outer skin defining a periphery of the second crash pad and at least one of: 1) a rib and web structure, and 2) an array of tubes disposed within the outer skin for absorbing crash energy, and stacking the first and second crash pads to form a crash box.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
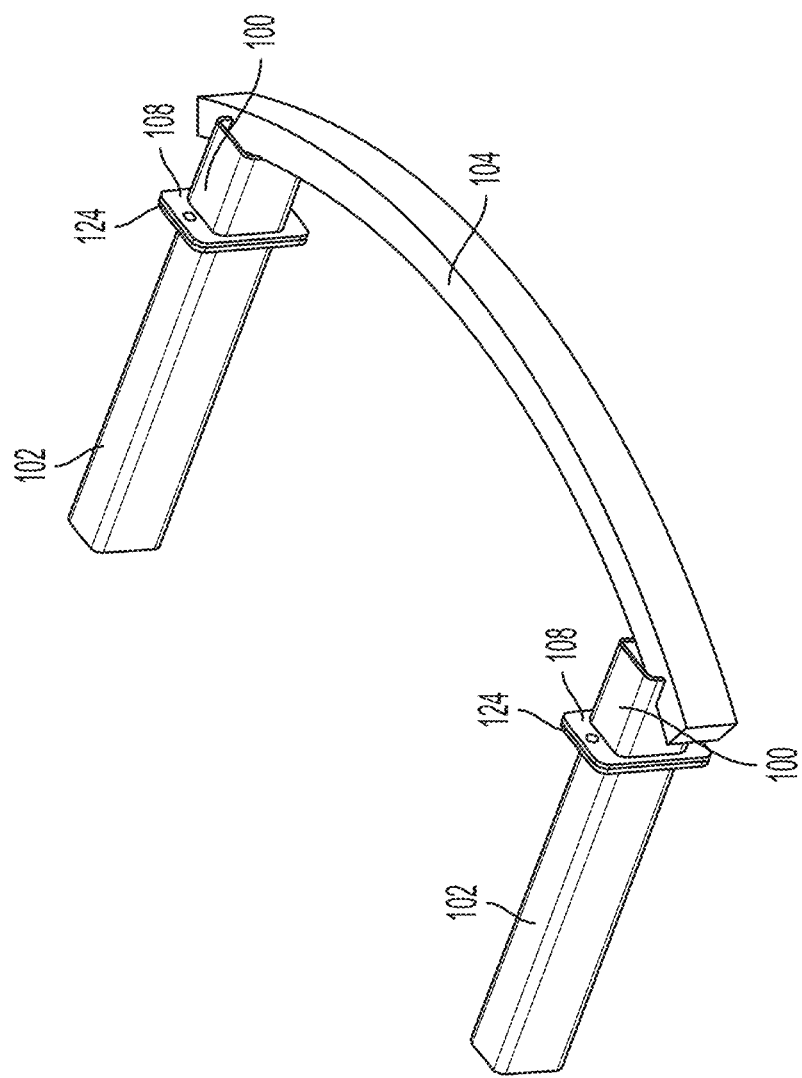
FIG. 1 shows a bumper crash management system, according to one embodiment.

With all of the safety innovations currently available, the inventors have recognized that there is demand to further improve the safety of automobiles, including, for example, improvements to vehicle design to further minimize injury to occupants resulting from frontal and rear crashes. The inventors have recognized a need for systems, structures, or devices that can be added to vehicles to absorb energy in benign ways during a crash. The inventors have also recognized that advantages may be realized if such systems, structures or devices minimize the need to make modifications to the vehicle, as well as minimize reductions in fuel economy. In some embodiments, such systems, structures, or devices may have low mass and minimize vehicle package space, and/or have a short overall length. The inventors have further recognized that it may be advantageous if the cost of such additions to the vehicle to improve safety are relatively low. Finally, the inventors have recognized a need for improved crash boxes that can be added to a vehicle to absorb energy while minimizing mass, length, and cost, and while maximizing design flexibility to be able to customize a crash box for a specific vehicle.

The first line of defense in a frontal crash for most automobiles is the front bumper. As is known, the bumper, typically part of the vehicle styling surface which is visible from outside the vehicle, is generally a polymer part, and is non-structural. Under the bumper is a crash management system that is designed to absorb energy and help manage the forces of a front crash. This crash management system generally consists of two brackets called crash boxes and a bumper beam that connects the crash boxes. Crash management systems may be located in both the front and rear bumpers of an automobile, with each system having two or more crash boxes. As will be appreciated, the crash box may be arranged to absorb crash energy that passes through front or rear bumpers of an automobile during a frontal or rear crash.

According to one aspect, a uniform deceleration unit (UDU) crash box is disclosed. In some embodiments, the crash box includes one or more crash pad layers, each layer having an outer skin with an inner rib and web structure. In such embodiments, the crash box may be arranged such that the one or more crash pad layers begin to crush (e.g., in an accordion-like fashion) and absorb crash energy at a desired peak load. Such a desired peak load may correspond to the maximum load tolerated by a given vehicle before serious damage to the vehicle occurs (e.g., buckling of the frame rails or other structural elements). As will be appreciated, the maximum load tolerated by a given vehicle may vary from vehicle to vehicle.

In some embodiments, the crash box may be designed to reach this peak load and absorb crash energy after minimal crushing (e.g., displacement) of the one or more crash pad layers. The crash box also may be designed to continue to absorb energy as the one or more crash pad layers continue to be crushed during a crushing sequence. As will be appreciated, the crushing sequence ends when the crash box is no longer displaceable (e.g., compressible). In some embodiments, the one or more layers may be arranged to simultaneously crush (e.g., each layer crushing at the same time) in response to an automobile crash. In other embodiments, the one or more layers may be arranged to sequentially crush, such that a first layer is completely crushed, at which point a second layer may begin to crush in response to the crash.

In some embodiments, the crash box includes a porous material (e.g., a cellular matrix such as a foam or honeycomb structure) in pockets defined by the rib and web structure. Such porous materials may provide relatively high strength and a capacity to absorb energy under deformation, while also minimizing mass and cost. In such embodiments, the porous material may assist in absorbing energy when the crash box begins to crush at the desired peak load. The porous material also may allow for additional energy to be absorbed during the remainder of the crushing sequence. That is, as the one or more crash pad layers are crushed, the porous material is compressed and absorbs energy. In some embodiments, the crash box includes an array of tubes to assist in absorbing energy. For example, the crash box may include an array of tubes in one or more pockets defined by the rib and web structure. In other embodiments, the crash box may include an array of tubes in place of the rib and web structure. In some embodiments, a porous material may be disposed within each of the tubes.

Turning now to the figures, in some embodiments, as shown in FIG. 1, a crash box 100 is arranged to connect to vehicle frame rails 102 and to a bumper beam 104. The crash box may be attached to the frame rails of a light vehicle, such as a car, truck, van, SUV, and/or crossover, or another type of vehicle. The crash box may be bolted onto the frame rails of the vehicle so that it can easily be replaced during repairs in the event of a crash, although the crash box may be attached to the rails via other suitable methods. In some embodiments, the crash box is attached to the frame rails via a mounting bracket (see FIG. 2). The crash box also may be bolted to the bumper beam, although the crash box also may be welded or otherwise mechanically joined to the bumper beam.

Figure 2:
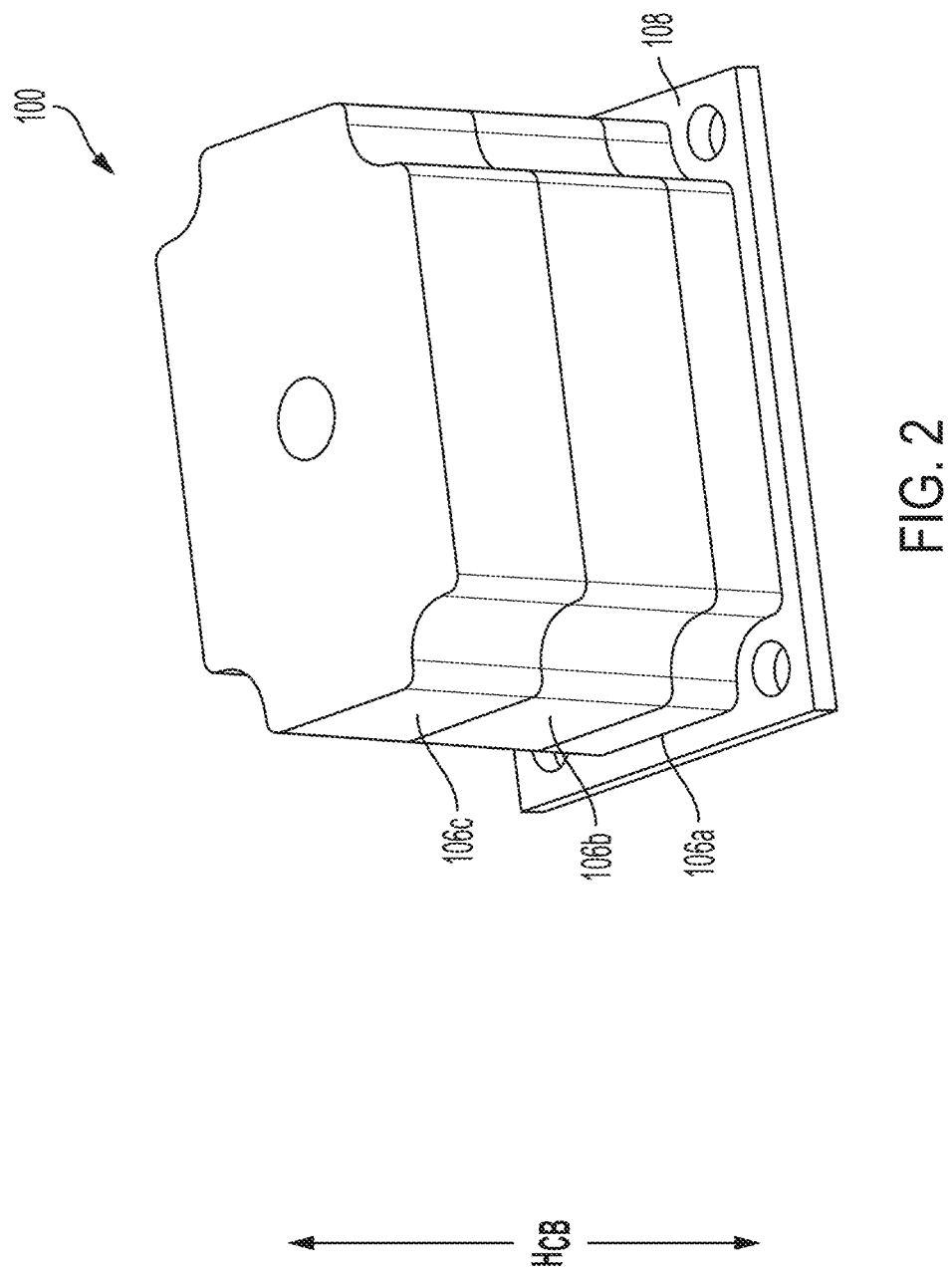
FIG. 2 shows a crash box according to one embodiment.

As shown in FIG. 2, according to some embodiments, the crash box 100 includes an assembly of one or more crash pad layers. In one example, as shown in FIG. 2, the crash box 100 may include three crash pad layers 106a, 106b, 106c, although the crash box may include more or fewer layers. For example, the crash box may include only one layer, may include two layers, or may include four or more layers. As also shown in FIG. 2, the first layer 106a may be attached to a mounting bracket 108. As will be appreciated, the first (base) layer 106a also may be integrally formed with the mounting bracket 108. The one or more crash pad layers may be attached to one another by a variety of methods including various welding techniques, fasteners, and adhesives.

Figure 3:
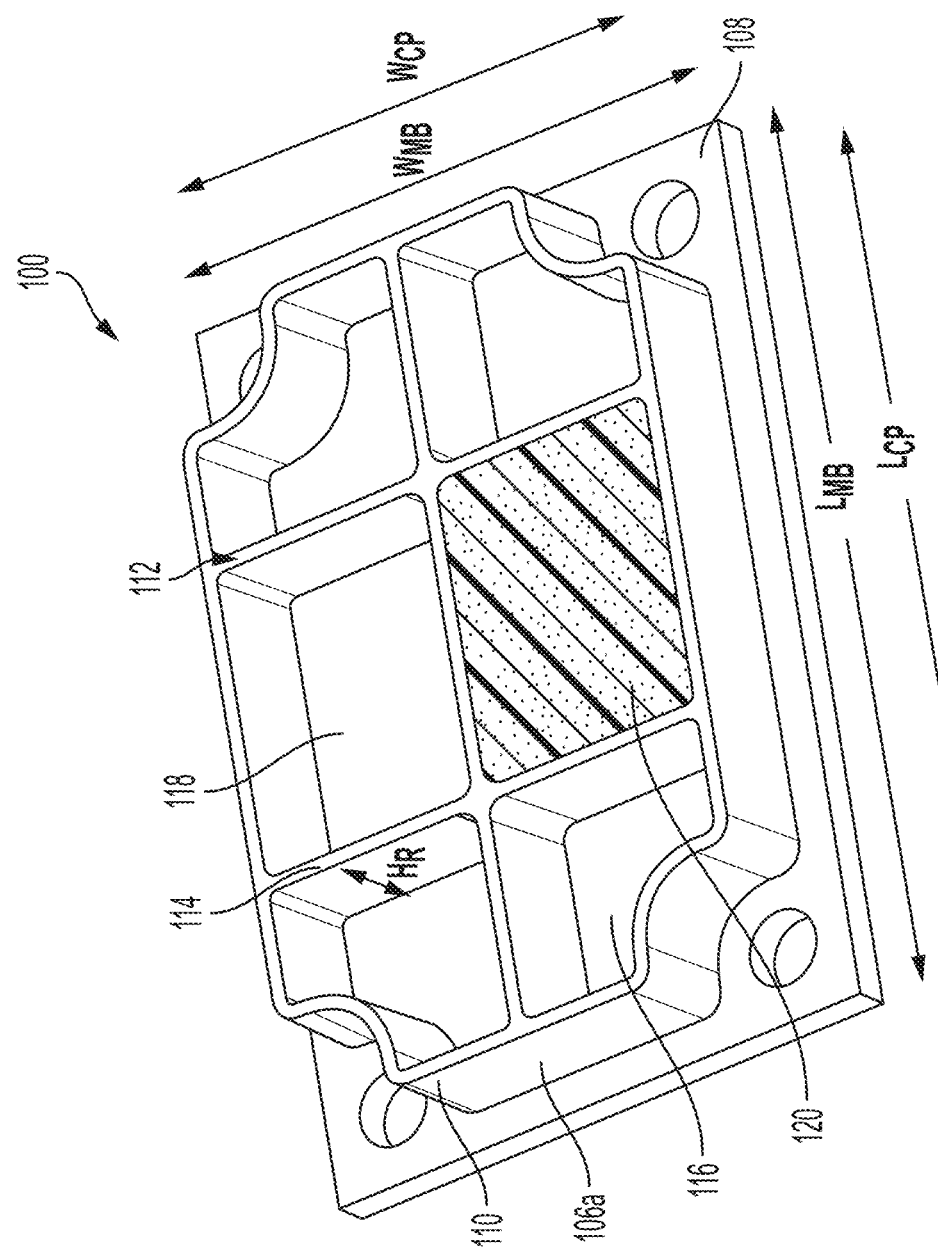
FIG. 3 shows a base crash pad layer of a crash box according to one embodiment.

As shown in FIG. 3, each crash pad layer (layer 106a shown) may include an outer skin 110 and an inner rib and web structure 112, which may serve as an energy absorption component of the crash box. In some embodiments, the outer skin defines a periphery of the crash pad layer. In some embodiments, the outer skin defines a top and bottom surface of the crash pad layer. In some embodiments, the inner rib and web structure 112 includes one or more ribs 114 that extend between a top and bottom of each crash pad layer. In some embodiments, the ribs extend only partially between the top and bottom of each crash pad layer, while in other embodiments, the ribs may extend completely between the top and bottom of each crash pad layer. In some embodiments, the height $H_R$ of each rib, a distance between a top and bottom of each rib, may be the same for all ribs in a crash pad layer, although the height of each rib may vary from rib to rib. The height of the ribs also may vary from crash pad layer to crash pad layer. Although the crash pad layer of FIG. 3 includes seven ribs 114, it will be appreciated, that the crash pad inner rib and web structure 112 may include any suitable number of ribs. For example, as shown in FIG. 9, the inner rib and web structure 112 may include only one rib 114.

Figure 9:
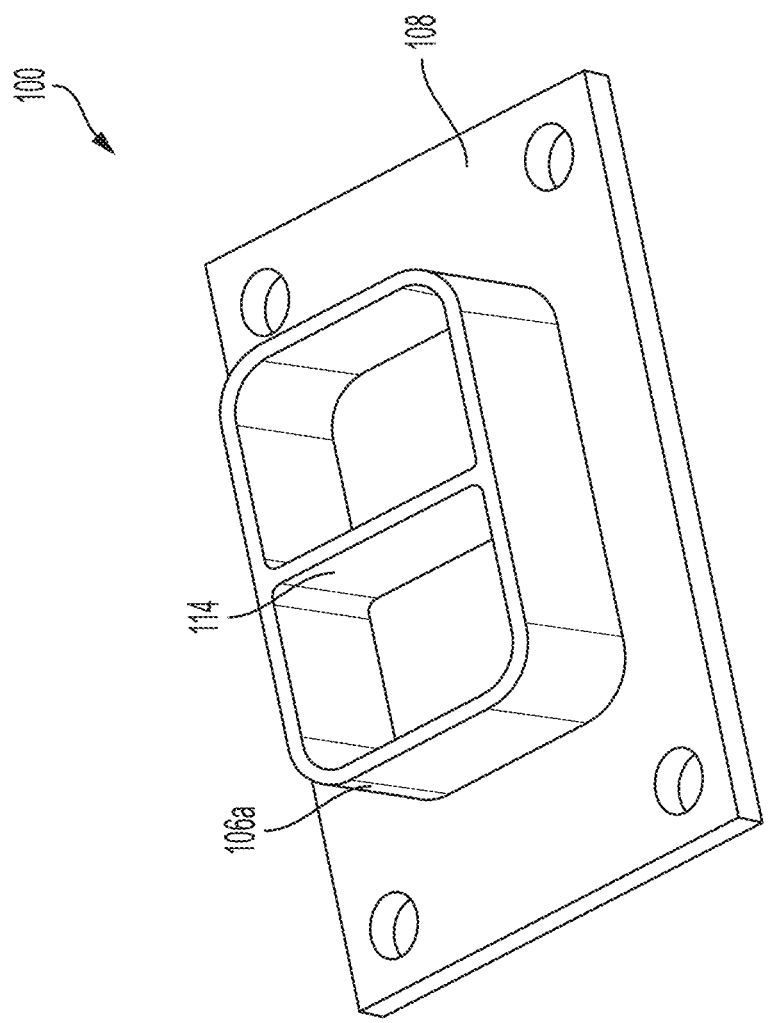
FIG. 9 shows an interior of a base layer of the crash box of FIG. 5.

As also shown in FIG. 9, in some embodiments, the inner rib and web structure may correspond to the cross-section of the frame rail. Without wishing to be bound by theory, in such embodiments, when the cross-section of the inner rib and web structure correspond to the cross-section of the frame rail, most if not all of the axial load may be transferred directly to the frame rail without creating shear forces that may prematurely fracture the frame rail mounting bracket. Such size matching may only be applicable to the inner structure of the crash box. The inner rib and web structure may have any suitable pattern.

In some embodiments, the ribs are formed from a ductile high strength, relatively low modulus material. This configuration may be fabricated by casting, forging, or other metal forming techniques. It may also be formed by additive technology processes. The matrix of ribs and webs could also be fabricated from a composite of engineered materials designed to give desired characteristics of strength and stiffness. For example, in some embodiments, the web structure may be covered with a high tensile strength material layer to help facilitate spreading of the crash force over a larger area of the crash pad.

As also shown in FIG. 3, the rib and web structure also includes one or more webs that intersect the one or more ribs. In FIG. 3, the webs are defined by the base 116 of the crash pad layer, although the webs may be located and intersect the ribs at any point between the top and bottom of the ribs. For example, the webs may be located half way between the top and bottom of the ribs. As will be appreciated, although the webs are shown as being perpendicular to the ribs in FIG. 3, in other embodiments, the webs may be arranged at an angle with respect to the ribs.

In some embodiments, one or more pockets 118 are formed between the ribs, outer skin 110, and webs 116 (e.g., the base) of the crash pad layer 106a. In some embodiment, pockets 118 are formed between the ribs, outer skins, and webs of first and second, adjacent crash pad layers. As will be appreciated, the size and shape of each pocket may be the same in some embodiments, although the shape and size of the pockets may vary from pocket to pocket. The size and shape of the pockets also may vary from crash pad layer to crash pad layer.

In some embodiments, a porous material 120 may be inserted into one or more pockets 118. The porous material also may serve as an energy absorption component of the crash box. In some embodiments, the porous material is constructed of a very low density cellular material such as metallic foam or honey comb material. As will be appreciated, the pockets need not be completely filled with the porous material. For example, the foam may occupy only 15 percent of a volume of each pocket. As will also be appreciated, the same amount of porous material need not be inserted into each pocket. That is, a larger pocket may include more porous material than a smaller pocket. As will be further appreciated, porous material need not be inserted into each pocket. For example, porous material may be inserted into only half of the pockets in a given layer. As will be further appreciated, the porous material included in a first layer need not be the same as the porous material in another layer of the crash box. Each crash pad may include one layer of cellular material or multiple layers of cellular material.

In some embodiments, each crash pad layer 106a may include an array of relatively thin walled tubes 121 (see FIG. 11), which, in some embodiments are oriented parallel to the vehicle fore-aft axis. The shape of the tubes could be round, rectangular, or any other closed geometric or organic shape. The tubes would be sandwiched between layers of light weight, high strength material. The bank of tubes can be either a single layer, a double layer, or multiple layers using a material or materials that are ductile, high strength, and relatively low modulus. This configuration may be formed by a variety of methods including extrusion, casting, and other metal forming techniques. The tube array may be generated as one continuous part or it may be formed from multiple discrete tubes joined together. The tube array could also be fabricated from a composite of engineered materials designed to give the desired characteristics of strength and stiffness. It may also be formed by additive technology processes.

In some embodiment, the array of thin walled tubes are filled with a very low density cellular material such as metallic foam or honey comb material. The bank of tubes can be either a single layer, a double layer, or multiple layers using a material or materials that are ductile, high strength, and relatively low modulus. This configuration may be formed by a variety of methods including extrusion, casting, and other metal forming techniques. The tube array may be generated as one continuous part or it may be formed from multiple discrete tubes joined together. The tube array could also be fabricated from a composite of engineered materials designed to give the desired characteristics of strength and stiffness. It may also be formed by additive technology processes.

Figure 11:
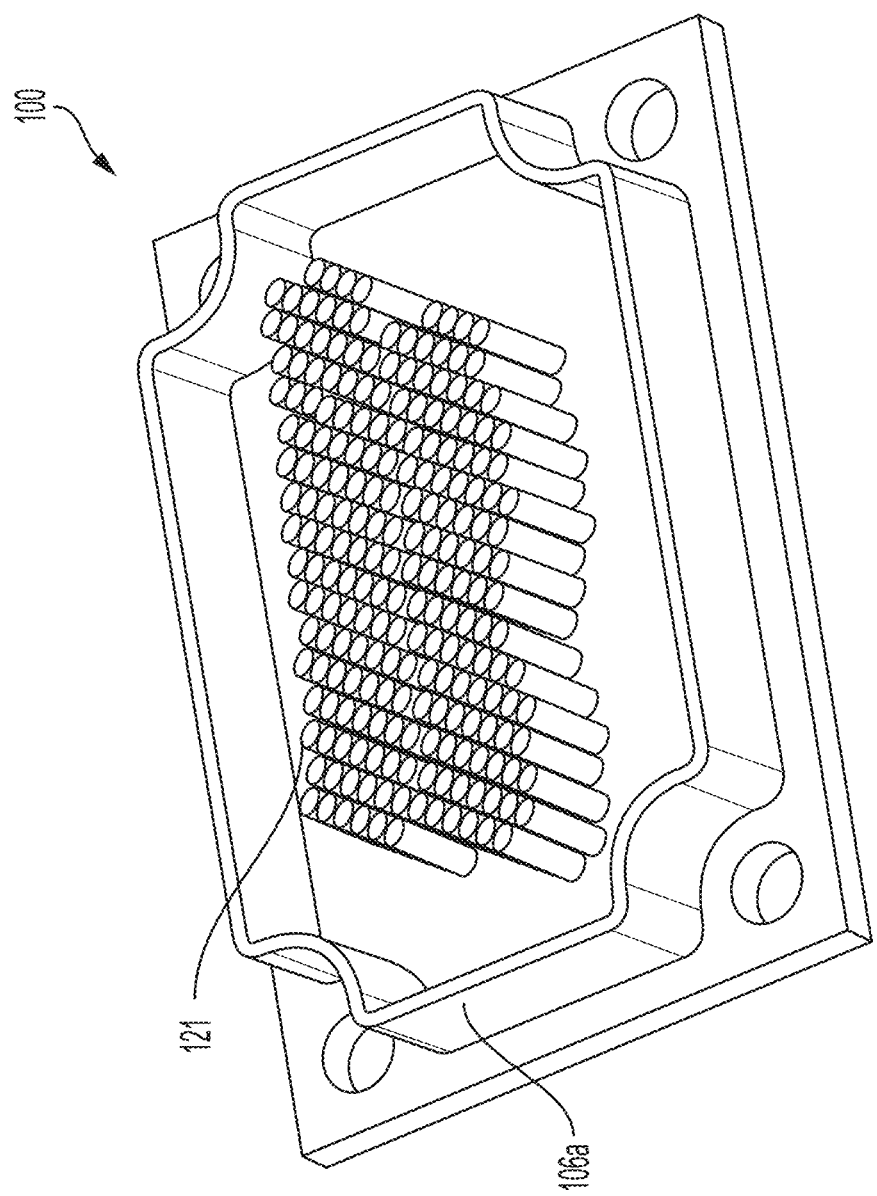
FIG. 11 shows a base crash pad layer of a crash box according to another embodiment.

Although the crash pad layer of FIG. 11 has only an array of tubes within the outer skin, it will be appreciated that the crash pad layer may have a rib and web structure, with an array of tubes disposed in the one or more of the pockets defined by the ribs and webs and outer skin. In such embodiments, the tubes may be filled with a porous material.

As will be appreciated, the crash pad may have any suitable shape. For example, the crash pad may be rectangular, square, circular, oval, or another suitable shape, such as that shown in the crash pad layer 106b of FIG. 4. As will be further appreciated, the shape of each layer need not be the same. For example, the first and third layers may be generally rectangular while the second layer is circular.

In some embodiments, the crash box may be between about 2 and 10 inches in height. As will be appreciated, the height $H_{CB}$ of the crash box 100 may be varied by adjusting the number of crash pad layers (see FIG. 2). For example, the height of the crash box may be increased by adding more crash pad layers and/or may be decreased by removing one or more crash pad layers. In some embodiments, the height of each crash pad layer is between about 1 and 8 inches. As will be appreciated, the height of each crash pad layer in the crash box need not be the same. For example, the first and third layers may be 2 inches in height while a second layer may be 4 inches in height.

As shown in FIG. 2, in some embodiments, the footprint of each crash pad layer, defined by a cross-sectional area of the crash pad layer, is the same. In other embodiments, as shown in FIG. 5-9, the crash box may be tapered such that the foot print may increase with the addition of additional crash pad layers. That is, the footprint may increase in a direction away from the base layer (from layer 106a to layer 106b to layer 106c). As will be appreciated, although the footprint of each crash pad layer is shown to increase in this embodiment, in other embodiments, the foot print of crash pad layers may decrease with the addition of additional pad layers. In other embodiments, the footprint may increase and then decrease with the addition of additional layers, such as in an alternating fashion. In some embodiments, a crash pad with a larger footprint may have larger energy absorption than a crash pad with a smaller footprint. For example, for the crash box shown in FIG. 5, an increase in footprint size from the base layer 106a to the top layer 106c may increase the crush volume and therefore absorb more energy.

Figure 4:
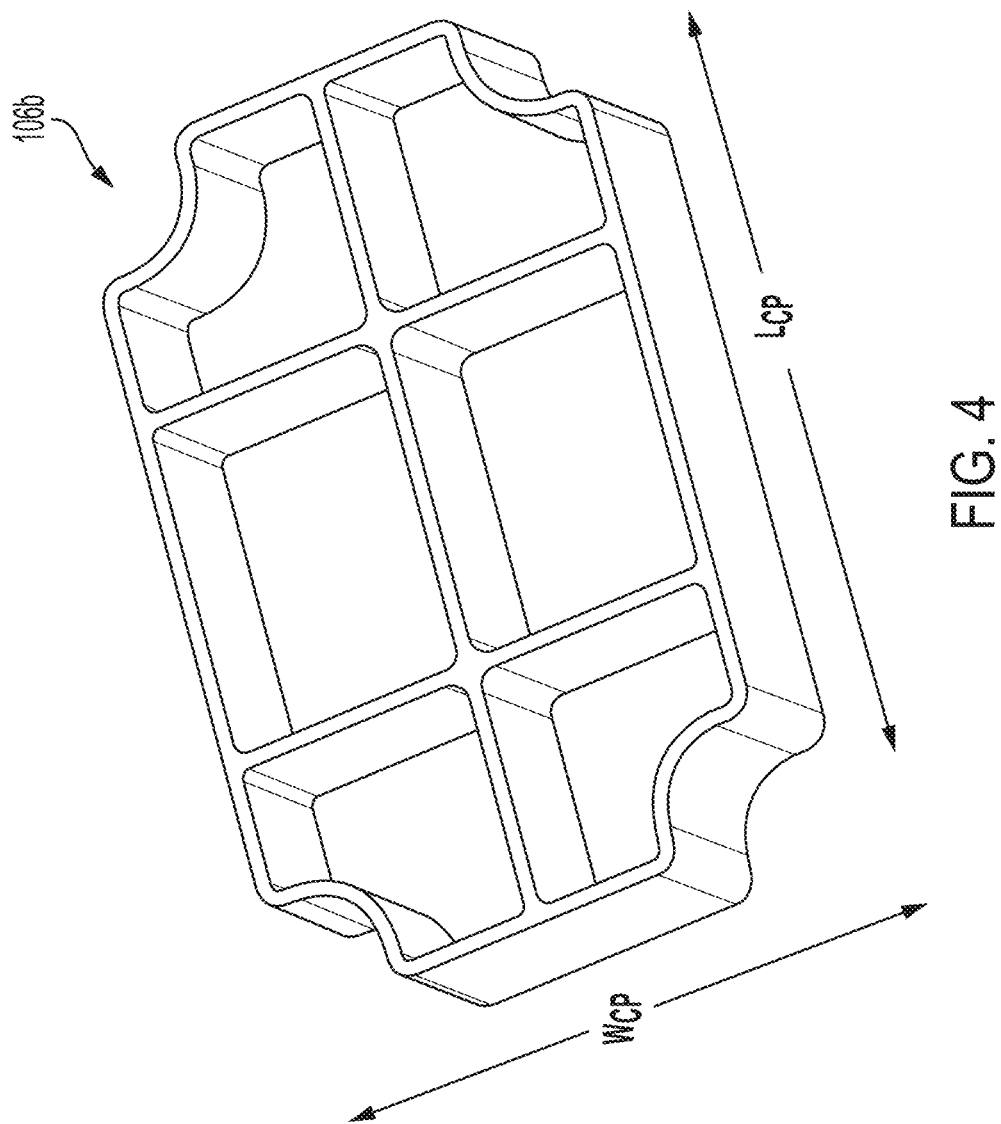
FIG. 4 shows an intermediate crash pad layer of a crash box according to one embodiment.
Figure 5:
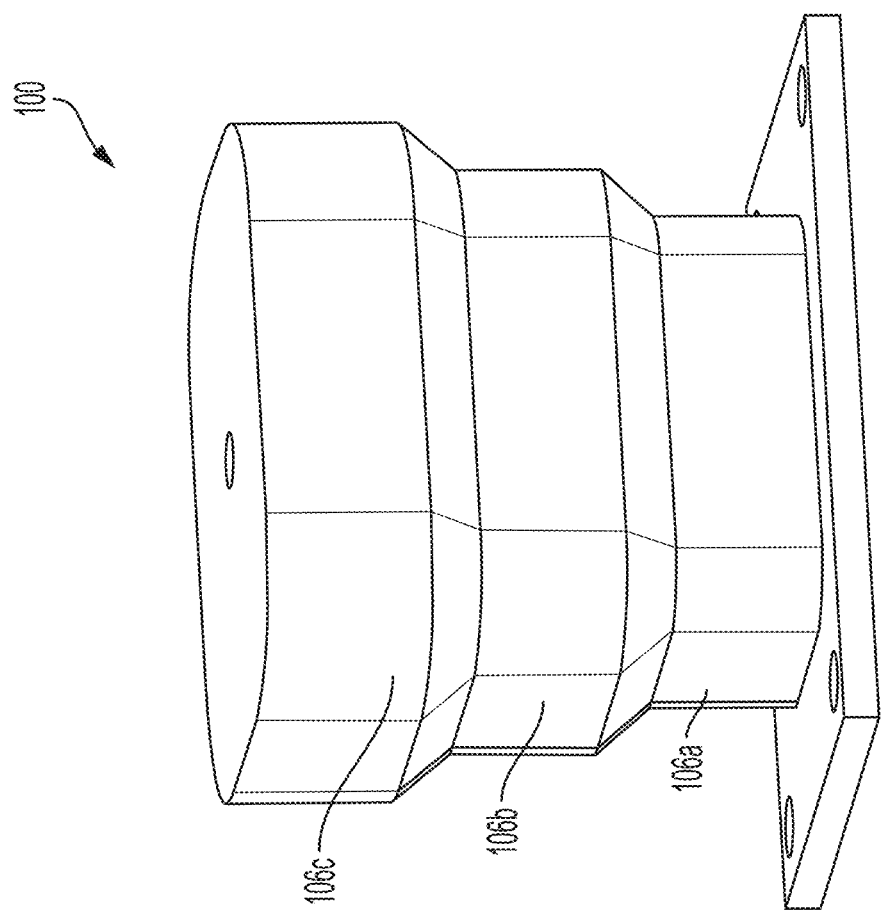
FIG. 5 shows a crash box according to another embodiment.

In some embodiments, the length $L_{CP}$ of the crash pad layer is between about 1.5 and 12 inches (see FIGS. 3 and 4). The width $W_{CP}$ of the crash pad layer may be between about 1.5 and 12 inches. The mounting bracket 108 may be between about 1.5 and 12 inches in length $L_{MB}$ and between about 1.5 and 12 inches in width $W_{MB}$ (see FIG. 4).

Figure 6:
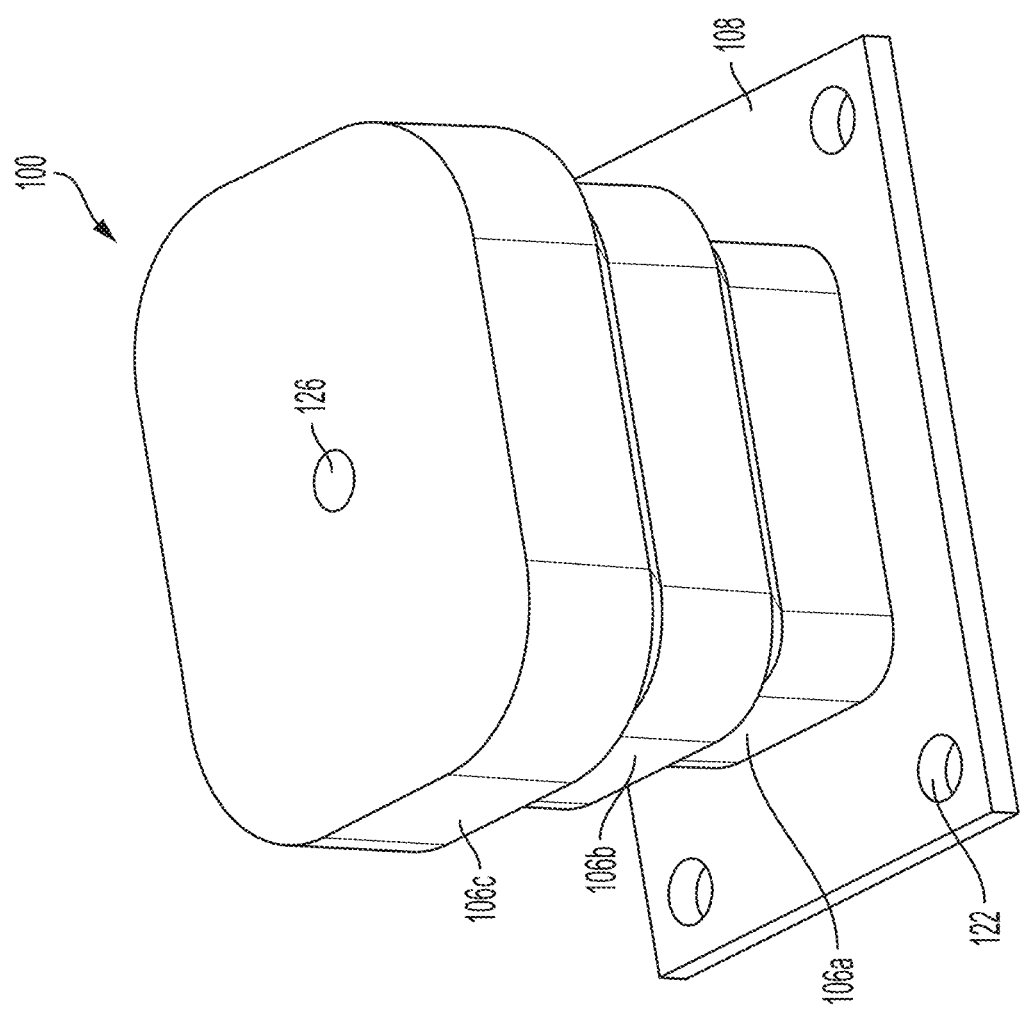
FIG. 6 is a top perspective view of the crash box of FIG. 5.
Figure 8:
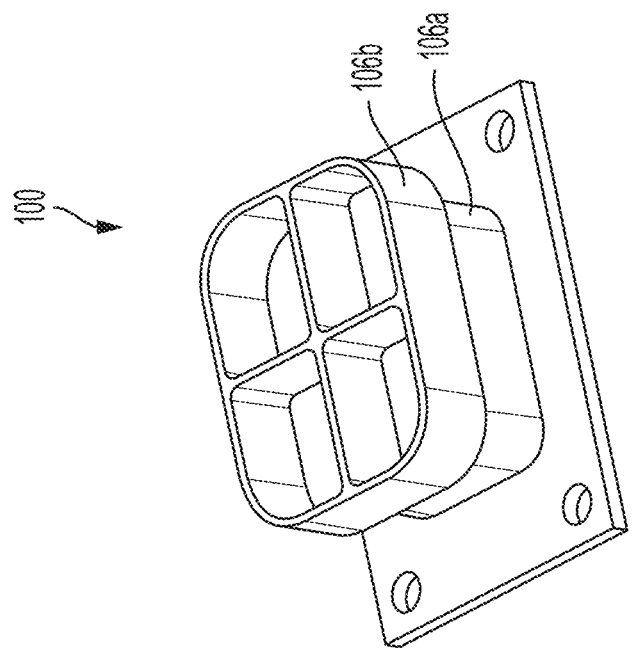
FIG. 8 shows an interior of an intermediate layer of the crash box of FIG. 5.
Figure 7:
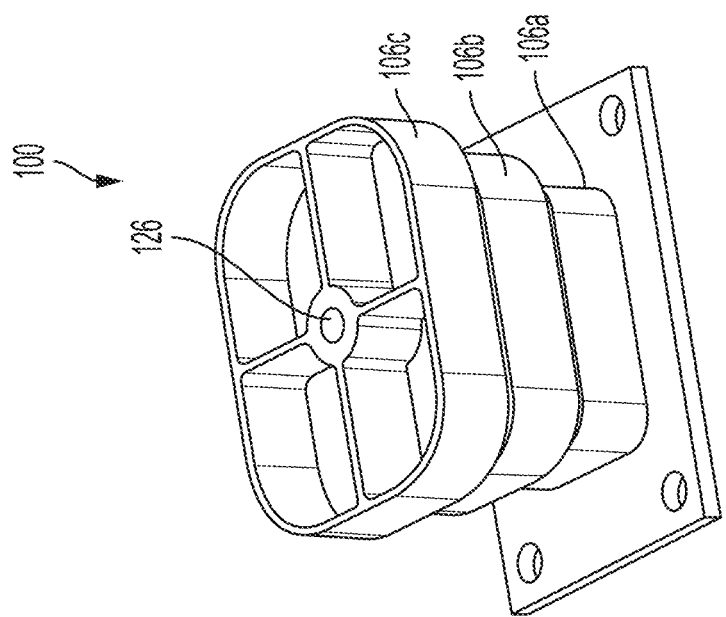
FIG. 7 shows an interior of a top layer of the crash box of FIG. 5.

As shown in FIG. 6, the crash box may include one or more mounting holes 122 (e.g., on mounting bracket 108 and on the top layer 106c) to attach the crash box to the mounting brackets 124 on the frame rails 102 and to the bumper beam 104. As shown in FIG. 7, in some embodiments, the third or top layer may include a boss 126 for attaching the crash box to the bumper beam. As will be appreciated, the top layer 106c of the crash box 100 can be adapted for type of interface hardware used for mounting and securing the bumper beam.

As will be appreciated, because of its high energy absorption capacity, the disclosed crash box may be smaller than conventional crash boxes. The crash box also may be the same size or may be larger than conventional crash boxes and may provide a greater energy absorption than conventional crash boxes. In such embodiments, irrespective of the size and energy absorption capacity, the crash box may be designed to crush at a peak load that corresponds to a load less than the maximum load tolerated by a given vehicle before serious damage to the vehicle occurs (e.g., buckling of the frame rails).

In some embodiments, the modular design of the disclosed crash box may allow the crash box to be adapted to fit any frame rail and bumper beam design. For example, the size and shape of the crash box mounting bracket 108 (e.g., the width and length) may correspond to the size and shape (e.g., width and length) of the frame rail mounting bracket 124 (see FIG. 1). In some embodiments, the layered design may allow the crash box to accommodate any bumper mounting hardware.

In some embodiments, the layered design may provide lateral stiffness for the bumper at a light weight. In some embodiments, the UDU crash box's layered design may provide lateral stiffness for the bumper beam attachment. For example, each of the thin walled rib and web layers, that have a high ratio of cross-sectional area to thickness, filled with aluminum foam, has a high lateral stiffness.

In some embodiments, the crash box may be fabricated as a monolithic single structure by casting, forging, or other metal forming techniques. It may also be formed by additive technology processes. In some embodiments, the one or more crash pad layers of the crash box may be formed as separate components and then joined via mechanical fasteners (i.e. screws, bolts, rivets), welding, adhesives, or other mechanical bonding methods such as friction stir welding or laser welding.

In some embodiments, the crash box may be formed of aluminum and/or aluminum alloys. For example wrought alloys such as 6061 or casting alloys such as A356, B206, or AA367 may be used. As will be appreciated, the crash box also may be formed of other suitable materials.

Figure 10:
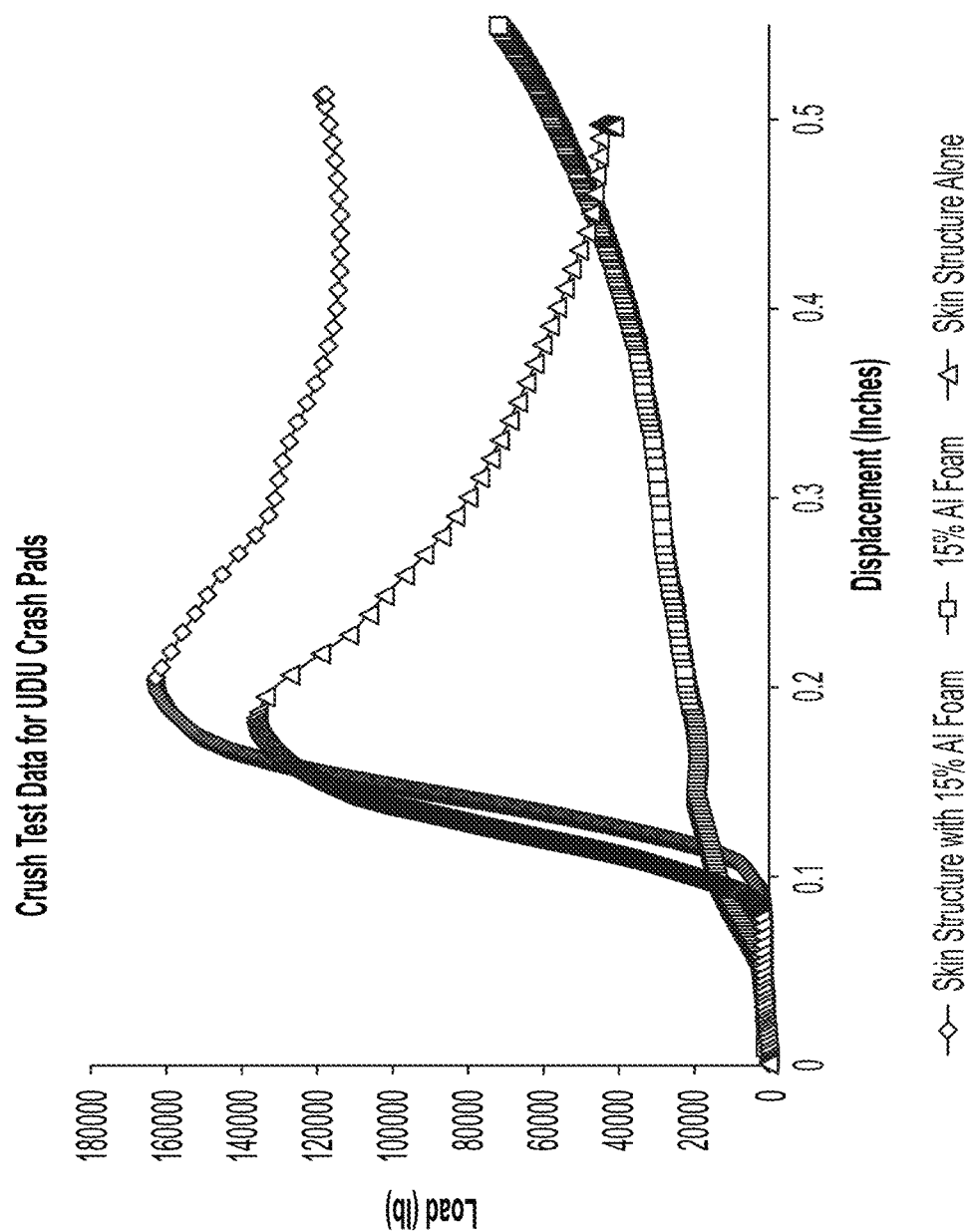
FIG. 10 illustrates test data for crash pads according to various embodiments.

Turning now to FIG. 10, which shows the data from a test performed on three different crash box assemblies having exactly the same cross-sectional area and the same one inch initial thickness. The first crash box included 15% dense aluminum foam sandwiched between 2 parallel thin aluminum plates without the rib and web skin, the second crash box included the rib and web aluminum skin without any foam and the third crash box included the rib and web aluminum skin with 15% dense aluminum foam in all of the pockets in the skin structure. This load vs. displacement data was collected from a test machine as the assemblies were individually crushed. The area under the curves corresponds to the energy absorbed by each of the structures due to the crushing.

The lowest curve in FIG. 10 (squares) was collected from crushing a cast 15% dense aluminum foam. As is shown, this curve has a low crush force at the beginning of the crush, but the crush force increases with increasing crush distance. The crush force for the aluminum foam was seen to increase significantly as the foam cells collapsed and the foam became increasingly more dense. Just beyond 0.6 inches of displacement a spike in crush force for the aluminum foam was observed.

The intermediate curve (triangles) was generated from crushing a rectangular skin box structure with axial ribs and webs inside the box. This box structure was constructed of 6061 T6 aluminum alloy. As can be seen from the graph in FIG. 10, the load for the skin structure spikes to a maximum (e.g., a peak load) at around 140,000 lbs., and then declines for the remainder of the crush sequence. As will be appreciated, energy is still able to be absorbed during the remainder of the crush sequence.

The top curve (diamonds) in FIG. 10 was collected from the crush of the 6061 T6 aluminum alloy skin with axial ribs and webs and 15% dense cast aluminum foam filling the rib and web pockets. As will be appreciated, more energy is absorbed by this configuration (e.g., there is a greater area under the load vs. displacement curve) as compared with the embodiments having only a rib and web structure (triangles) or only foam (squares).

In view of the data in FIG. 10, the inventors have realized that the crash box can be designed to achieve a specified peak force in a relatively short displacement when the one or more crash pad layers include a rib and web structure. For example, a crash box being smaller (e.g., shorter) and/or having a lower mass may be used to absorb the same or greater peak force than existing crash boxes. In embodiments in which foam is placed in the pockets of the rib and web structure, the characteristics of the aluminum foam, which may naturally become stiffer as the material crushes and becomes denser, may be used to maintain the load and, thus, energy absorption, at or near the peak structure force for a specified displacement. Such a foam also may minimize the mass required to deliver a unit of energy absorption.

This combination of deformation characteristics suggests that a crash pad layer having a rib and web structure (or an array or relatively thin walled tubes) paired with an appropriate density, thickness, and quantity of porous material, such as aluminum foam, may be combined to produce a composite structure that is capable of maximizing the energy absorption for a given load and a given displacement. As will be appreciated, the disclosed crash box may be designed to allow more energy absorption in smaller spaces that allow less displacement.

Although embodiments have been shown and described as using one or more crash pads layers to tailor energy absorption of a crash box, it will be appreciated that the disclosed crash pads may be used in other UDUs in an automobile. For example, the crash pads may be used in a UDU placed in the wheel well of an automobile, the wheel well UDU having two crash pads and a connection beam. As with other embodiments, each crash pad in the wheel well UDU may have an outer skin and a rib and web structure (or an array of tubes). Each crash pad also may include a porous material in the pockets of the rib and web structure (or in the tubes). As with other embodiments, the wheel well UDU may be designed to accommodate a peak load corresponding to the maximum load tolerated by the automobile before the lower dash panel, firewall, and A-pillar, for example, may intrude into the vehicle occupant space and injure the vehicle occupants.

According to another aspect of the present disclosure, a method of assembling a crash box is disclosed. In some embodiments, the method includes providing a plurality of crash pads. Next, the method includes selecting a first crash pad from the plurality of crash pads. As with the above embodiments, the first crash pad may have an outer skin and a rib and web structure. In some embodiments, a porous material or an array of tubes may be disposed within the pockets defined by the rib and web structure. In other embodiments, the first crash pad may have an array of tubes instead of the rib and web structure. Next, the method includes selecting a second crash pad from the plurality of crash pads. Similar to the first crash pad, the second crash pad may have a rib and web structure and/or an array of tubes. The second crash pad also may have a porous material disposed in the pockets of the rib and web structure. In some embodiments, the first and second crash pads may be the same (e.g., the same size and/or rib and web structure), while in other embodiments, the first and second crash pads may be different (e.g., different sizes and/or rib and web structures). Finally, the first and second crash pads may be stacked on top of one another to form the crash box. In some embodiments, the method includes attaching the first and second layers to one another. In some embodiments, the method includes selecting a third crash pad, the third crash pad being stacked on top of the first and second crash pads to form the crash box. As will be appreciated, the third crash pad may be the same as or may be different from one or both of the first and second crash pads.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A crash box for a motor vehicle, the crash box comprising:
   a first crash pad having an outer skin defining a periphery of the first crash pad and a plurality of discrete, hollow tubes arranged to absorb crash energy, wherein each of the discrete, hollow tubes is joined to a base of the first crash pad and/or directly to an adjacent tube; and
   a second crash pad located adjacent the first crash pad, the second crash pad having an outer skin defining a periphery of the second crash pad and a plurality of discrete, hollow tubes arranged to absorb crash energy, wherein each of the discrete, hollow tubes is joined to a base of the second crash pad and/or directly to an adjacent tube.

2. The crash box of claim 1, further comprising a pocket located between the discrete, hollow tubes and at least a portion of the outer skin of at least one of the first and second crash pads.

3. The crash box of claim 2, further comprising a porous material disposed in the pocket.

4. The crash box of claim 3, wherein the porous material includes a porous foam or a honeycomb structure.

5. The crash box of claim 1, further comprising a mounting bracket attached to at least one of the first or second crash pad.

6. The crash box of claim 5, wherein the mounting bracket includes one or more mounting holes arranged to attach the crash box to a portion of an automobile.

7. The crash box of claim 1, wherein the first crash pad is stacked on top of the second crash pad.

8. The crash box of claim 1, wherein an arrangement of the plurality of discrete, hollow tubes of the first crash pad is the same as an arrangement of the plurality of discrete, hollow tubes of the second crash pad.

9. The crash box of claim 1, wherein an arrangement of the plurality of discrete, hollow tubes of the first crash pad is different from an arrangement of the plurality of discrete, hollow tubes of the second crash pad.

10. The crash box of claim 1, wherein the outer skin of the first crash pad is the same size as the outer skin of the second crash pad.

11. The crash box of claim 1, wherein the outer skin of the first crash pad is differently sized from as the outer skin of the second crash pad.

12. A method of assembling a crash box for a motor vehicle, the method comprising:
   providing a plurality of crash pads, the plurality of crash pads configured to absorb crash energy;
   selecting a first crash pad of the plurality of crash pads, the first crash pad having an outer skin defining a periphery of the first crash pad and a plurality of discrete, hollow tubes disposed within the outer skin for absorbing crash energy, wherein each of the discrete, hollow tubes are joined to a base of the first crash pad and/or directly to an adjacent tube; and
   selecting a second crash pad of the plurality of crash pads, the second crash pad having an outer skin defining a periphery of the second crash pad and a plurality of discrete, hollow tubes disposed within the outer skin for absorbing crash energy, wherein each of the discrete, hollow tubes are joined to a base of the second crash pad and/or directly to an adjacent tube, and wherein the second crash pad is configured to be crushed after the first crash pad.

13. The method of claim 12, further comprising stacking the first crash pad on the second crash pad.

14. The method of claim 12, wherein the first and second crash pads are configured to undergo both elastic and plastic deformation to convert kinetic energy into strain energy.

15. The method of claim 12, wherein the first crash pad has a first outer skin height and the second crash pad has a second outer skin height different than the first outer skin height.

16. The method of claim 12, wherein at least one of the first and second crash pads has a pocket located between the plurality of discrete, hollow tubes and at least a portion of the outer skin of the at least one of the first and second crash pads.

17. The method of claim 16, wherein at least one of the first and second crash pads includes a porous material disposed in the pocket.

18. The method of claim 17, wherein the porous material includes a porous foam or a honeycomb structure.

19. The method of claim 12, further comprising attaching a mounting bracket to at least one of the first or second crash pad.

20. The method of claim 12, wherein an arrangement of the plurality of discrete, hollow tubes of the first crash pad is different from an arrangement of the plurality of discrete, hollow tubes of the second crash pad.

21. The method of claim 12, wherein the outer skin of the first crash pad is the same size as the outer skin of the second crash pad.

22. The method of claim 12, wherein the outer skin of the first crash pad is differently sized from the outer skin of the second crash pad.

* * * * *